United States Patent [19]
Morita

[11] Patent Number: 5,672,208
[45] Date of Patent: Sep. 30, 1997

[54] PLASMA DISCHARGE APPARATUS

[75] Inventor: Tetsuya Morita, Kanagawa, Japan

[73] Assignee: Sony Corporation, Tokyo, Japan

[21] Appl. No.: 518,310

[22] Filed: Aug. 23, 1995

[30] Foreign Application Priority Data

Aug. 24, 1994 [JP] Japan .................................. 6-199635
May 12, 1995 [JP] Japan .................................. 7-114927

[51] Int. Cl.$^6$ .................................................. C23C 16/00
[52] U.S. Cl. .................................. 118/723 E; 313/231.31
[58] Field of Search .................. 156/345; 118/723 E, 118/723 ER; 204/298.39; 345/60; 313/231.31, 231.41; 315/111.21, 111.71

[56] References Cited

U.S. PATENT DOCUMENTS

| | | | |
|---|---|---|---|
| 4,368,465 | 1/1983 | Hirakawa et al. | 340/771 |
| 4,613,855 | 9/1986 | Person et al. | 340/718 |
| 4,841,556 | 6/1989 | Kato et al. | 378/119 |
| 5,086,257 | 2/1992 | Gay et al. | 315/169.4 |

FOREIGN PATENT DOCUMENTS 0 261 914 A2  3/1988  European Pat. Off..

OTHER PUBLICATIONS

Patent Abstracts of Japan, E-1492, p. 158 JP.A 05-266804 (Noritake Co. Ltd), Oct. 15, 1993.
KR 8702196 B (Gold Star Co.), Dec. 28, 1987.
Derwent Abstract Accession No. 95 010224/04 Class V05, JP.A, 06-295674 (Fujitsu General ltd.), Oct. 21, 1994.

*Primary Examiner*—John Niebling
*Assistant Examiner*—Joni Y. Chang
*Attorney, Agent, or Firm*—Hill, Steadman & Simpson

[57] ABSTRACT

A plasma discharge apparatus formed with a plasma chamber in which discharge is carried out wherein use is made, as the discharge gas sealed in the plasma chamber, of a mixed gas represented by $Ne_{100-x}Ar_xA_y$ (wherein, A is Ar, Kr, and/or Xe, x is 10 to 30 percent by volume, and y is 1 to 10 percent by volume). Note that when Kr and Xe are included as A, it is preferable that the Kr be included in an amount of 1 to 5 percent by volume and the Xe in an amount of 1 to 5 percent by volume.

12 Claims, 6 Drawing Sheets

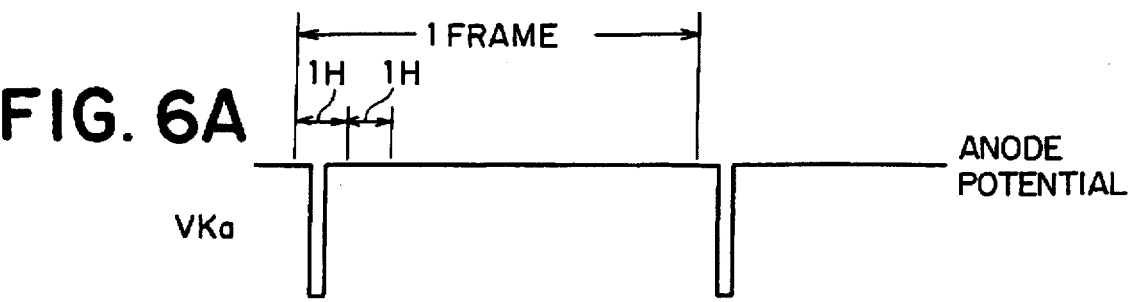
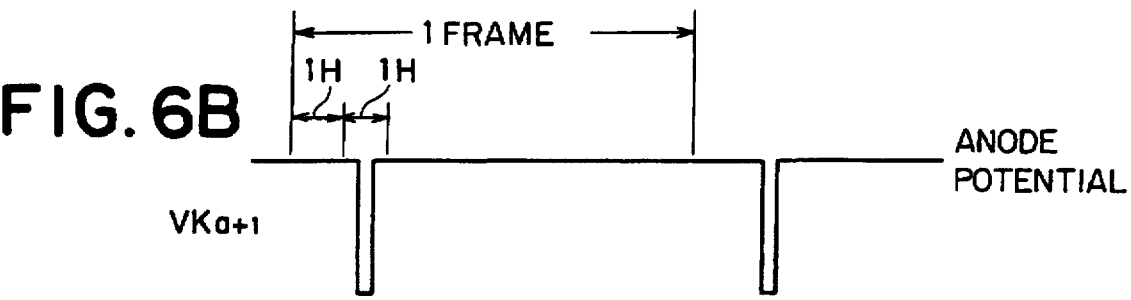
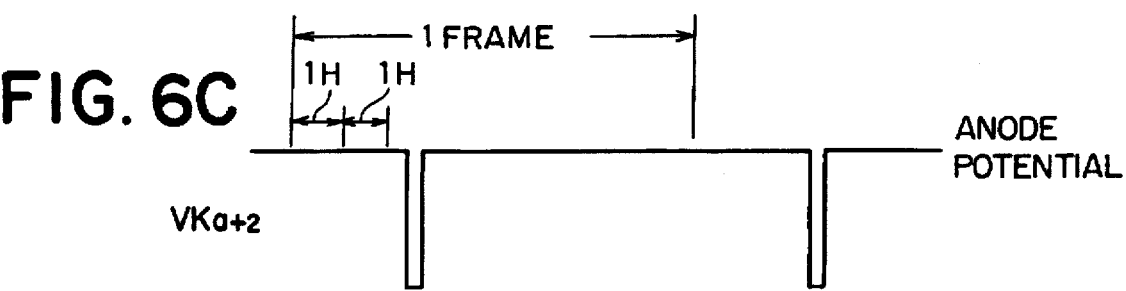
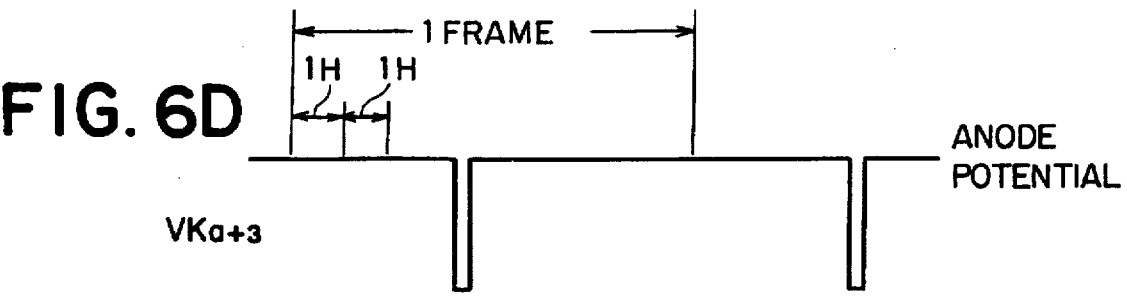
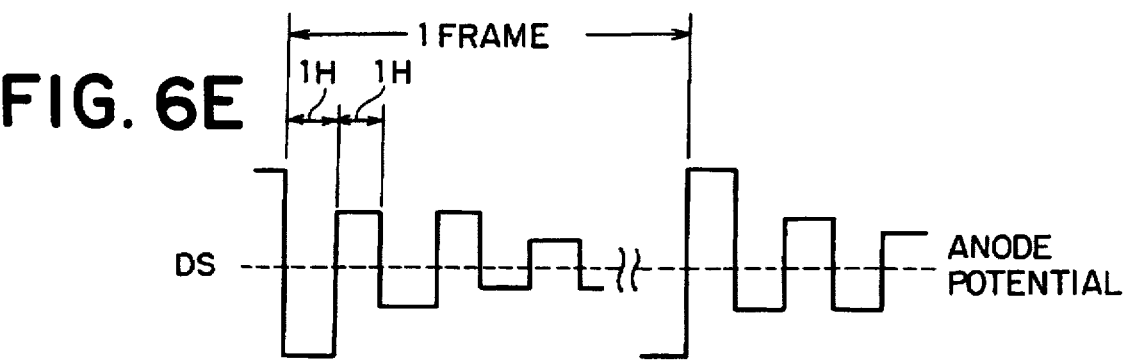

RELATIONSHIP BETWEEN Ar DENSITY IN NeAr SYSTEM AND Vf (AT Ar RICH REGION)

PLASMA DISCHARGE APPARATUS

BACKGROUND OF THE INVENTION

1. Field of the Invention

The present invention relates to a plasma discharge apparatus, more particularly a plasma addressed display apparatus such as a plasma addressed electro-optical apparatus, still more particularly to an improvement of the gas sealed in a plasma chamber.

2. Description of Related Art

In the past, there has been known a matrix type electro-optical apparatus using a liquid crystal cell as the electro-optical cell, for example, a liquid crystal display apparatus. An active matrix type liquid crystal display apparatus has been developed which provides a switching element such as a thin film transistor for each pixel and linearly drives the same as a means for achieving a higher resolution and higher contrast.

In this case, however, there is the problem that it is necessary to provide a large number of thin film transistors or other semiconductor elements on the substrate. The manufacturing yield becomes poor when the surface area is increased.

For this reason, recently a system of use of plasma switches, that is, one which utilizes switches operating based on plasma discharge instead of switching elements comprised of thin film transistors, to drive the electro-optical cell has been proposed (for example, see Japanese Unexamined Patent Publication (Kokai) No. 1-217396 and Japanese Unexamined Patent Publication (Kokai) No. 5-297359).

A plasma addressed display apparatus utilizing such a plasma switch has a display cell comprised, for example, of a liquid crystal cell and has a plasma cell arranged close to this having a plasma chamber of a range of discharge of a plasma electrode formed in the row direction in a stripe manner. The display cell is driven for each pixel by the electric field based on the range of discharge of this plasma cell.

As the discharge gas sealed in such a plasma chamber, from the viewpoint of lowering the discharge voltage (Vf), a Penning gas has been used. The Penning gas is prepared by mixing a minute amount of xenon (Xe) and argon (Ar) in a base of helium (He) or neon (Ne) (for example, $He_{99}Xe_1$, $Ne_{99.5}Ar_{0.5}$).

However, both of the He-based Penning gas and the Ne-based Penning gas have problems as will be mentioned below. Namely, it has become clear from experiments carried out by the present inventors that the He-based Penning gas is apt to cause cathode sputtering and shortens the service life of a display apparatus. In a plasma addressed display apparatus, a metal such as nickel or aluminum is used as the cathode material, but in comparison with an Ne-based Penning gas, there is conspicuous deterioration due to the sputtering of the cathode. When the cathode is being sputtered, the sputtered substance deposits at the opening portion and thereby causes a reduction of the transmittance. Further, with an He-based Penning gas, since the He molecules are small, they are apt to scatter from the thin plate glass (for example, thickness of 50 μm) constituting a part of the plasma chamber to the outside. For example, in an actual display apparatus, to stabilize the discharge, mercury is diffused in the display chamber, but in the heat treatment step for the diffusion (for example, 250° C. for 48 hours), the He ends up scattered and lost to the outside. In a case of a 14-inch panel having an inner volume of about 10 cc, if the He gas pressure is set to 120 Torr, the gas pressure ends up lowered to about 40 Torr in the above-described heat treatment step and there was the problem that the effective plasma could no longer be formed.

On the other hand, where an Ne-based Penning gas is used, although there is less of a problem of the cathode sputtering and the scattering and loss of the gas as described above, there was a problem in that the orange discharge color of Ne lowers the contrast of the display and the color purity.

SUMMARY OF THE INVENTION

An object of the present invention is to provide a plasma discharge apparatus which can exhibit good characteristics stably for a long period.

Another object of the present invention is to provide a further improved plasma addressed display apparatus which is free from the problem of color, has little scattering and loss of gas, is superior in durability, and has little erroneous writing.

According to the present invention, there is provided a plasma discharge apparatus including: a pair of substrates forming a discharge space; and an ionizable gas sealed in the discharge space, the ionizable gas being a mixed gas comprised of neon plus 10 to 30 percent by volume of an element selected from the group of argon, krypton, and xenon.

Preferably, the mixed gas is comprised of neon plus 10 to 30 percent by volume of argon and 1 to 10 percent by volume of krypton or xenon.

Preferably, the mixed gas is comprised of neon plus 10 to 30 percent by volume of argon, 1 to 5 percent by volume of krypton, and 1 to 5 percent by volume of xenon.

Also, preferably, the mixed gas is comprised of neon plus 10 to 30 percent by volume of argon, 1 to 5 percent by volume of krypton, and 1 to 5 percent by volume of xenon.

Preferably, one of the pair of substrates is a dielectric sheet.

Preferably, the plasma discharge apparatus is further provided with an electro-optical cell holding an electro-optical material between the dielectric sheet and a glass substrate.

Preferably, the electro-optical cell is a liquid crystal display cell which has a plurality of signal electrodes arranged in parallel at the inside of the glass substrate and which has as the electro-optical material a liquid crystal.

Preferably, the other of the pair of substrates has a plurality of discharge electrodes on it and a plasma discharge is caused between adjoining discharge electrodes to address the liquid crystal cell.

Also, according to the present invention, there is provided a plasma addressed electro-optical apparatus including: a plasma cell where plasma discharge is performed; an ionizable gas sealed in the plasma cell, the ionizable gas being a mixed gas comprised of neon plus 10 to 30 percent by volume of an element selected from the group of argon, krypton, and xenon; and an electro-optical cell laminated on the plasma cell and address by the plasma discharge.

Preferably, the plasma addressed electro-optical apparatus is provided with a dielectric sheet interposed between the plasma cell and electro-optical cell.

The electro-optical cell may be a liquid crystal display cell comprising a liquid crystal filled between a first glass substrate having a plurality of signal electrodes arranged in parallel on its inside and the dielectric sheet.

The plasma cell may be comprised of a second glass substrate and the dielectric sheet between which is sealed the ionizable gas.

The plasma cell may be provided with a plurality of discharge electrodes formed on the second glass substrate and a plasma discharge is caused between adjoining discharge electrodes to address the electro-optical cell.

Preferably, the mixed gas is comprised of neon plus 10 to 30 percent by volume of argon and 1 to 10 percent by volume of krypton or xenon.

Also, preferably, the mixed gas is comprised of neon plus 10 to 30 percent by volume of argon, 1 to 5 percent by volume of krypton, and 1 to 5 percent by volume of xenon.

The present inventors engaged in intensive studies so as to solve the problems of the lowering of the service life or characteristics of the products due to the discharge gas as described above in a plasma discharge apparatus and as a result discovered that a plasma discharge apparatus having a longer service life and a shorter plasma life can be formed without greatly increasing the discharge voltage compared with the case of the conventionally used He-based or Ne-based Penning gas by using as the discharge gas a mixed gas prepared by incorporating in a base of Ne (neon) or Ar (argon) a specific ratio of Ar, Kr or Xe and thereby completed the present invention.

Namely, the plasma discharge apparatus according to a first aspect of the present invention is a plasma discharge apparatus formed with a plasma chamber in which discharge is carried out wherein use is made, as the discharge gas sealed in the plasma chamber, of a mixed gas represented by $Ne_{100-x}Ar_xA_y$ (wherein, A is Ar, Kr, and/or Xe, x is 10 to 30 percent by volume, and y is 1 to 10 percent by volume). Note that when Kr and and Xe are included as A, it is preferable that the Kr be included in an amount of 1 to 5 percent by volume and the Xe in an amount of 1 to 5 percent by volume.

The plasma addressed display apparatus according to a second aspect of the present invention is one which is provided with a plasma cell having a plasma chamber in which a discharge is carried out and a display cell which is arranged close to this plasma chamber and is driven by an electric field based on the range of discharge of this plasma cell and in which the discharge gas sealed in the plasma chamber is a mixed gas represented by $Ne_{100-x}Ar_xA_y$ (wherein, A is Ar, Kr, and/or Xe, x is 10 to 30 percent by volume, and y is 1 to 10 percent by volume).

In the plasma addressed display apparatus, the display cell may be for example a liquid crystal cell.

In this way, in the plasma addressed display apparatus of the present invention, the discharge gas sealed in the plasma chamber is made a mixed gas represented by $Ne_{100-x}Ar_xA_y$ (wherein, A is Ar, Kr, and/or Xe, x is 10 to 30 percent by volume, and y is 1 to 10 percent by volume).

Each of molecules contained in the above-described mixed gas used in the present invention becomes a considerably large molecule in comparison with He and therefore even if the heat treatment for the diffusion of mercury is carried out, the problem of scattering and loss of the gas molecules from the plasma cell as mentioned above does not occur, a predetermined gas pressure, for example, 120 Torr, can be maintained, and a stable plasma formation in comparison with the conventionally used He-based Penning gas is possible.

Also, in comparison with the He-based Penning gas, with the Ne-based the mixed gas according to the present invention, the rate of advance of the cathode sputtering is much slower in the same way as the conventional Ne-based Penning gas and, the rate of deterioration of the transmittance due to such cathode sputtering is slower by one order than a case where the He-based Penning gas is used.

Further, where the mixed gas according to the present invention is used, although not comparable to the case where the He-based Penning gas is used, the luminance is sufficiently low in comparison with the case of the Ne-based Penning gas, the color is close to white, and the contrast of the display and the color purity are not substantially impaired, so good characteristics are obtained.

Note that, by adding Ar or the like to the Ne, the discharge voltage Vf which is needed rises in comparison with the case of the Ne-based Penning gas but in the present invention, the amount of addition thereof is restricted to 10 to 30 percent by volume, and therefore the amount of rise thereof is suppressed to about 20 V and it is possible to substantially prevent problems such as a rise of the power consumption, voltage resistance of the driver transistor, etc.

Further, in the present invention, since the Ne—Ar (10 to 30 percent by volume)-based gas includes a specific ratio of K and/or Xe (1 to 10 percent by volume), the attenuation time of the plasma can be made about ½ compared with the Ne—Ar (10 to 30 percent by volume)-based gas. If the attenuation time of the plasma becomes shorter, there is no longer data voltage erroneously applied to a pixel corresponding to a plasma chamber which inherently should not be written at the time of selection of the next line and, also, a sufficient contrast can be obtained.

BRIEF DESCRIPTION OF THE DRAWINGS

These and other objects and features of the present invention will become clearer from the following description of the preferred embodiments given with reference to the attached drawings, in which:

FIGS. 6A to 6E are waveform diagrams showing changes in the cathode voltage and data voltage;

DESCRIPTION OF THE PREFERRED EMBODIMENTS

Below, a plasma discharge apparatus and a plasma addressed display apparatus of the present invention will be explained further concretely by embodiments.

Figure 1:
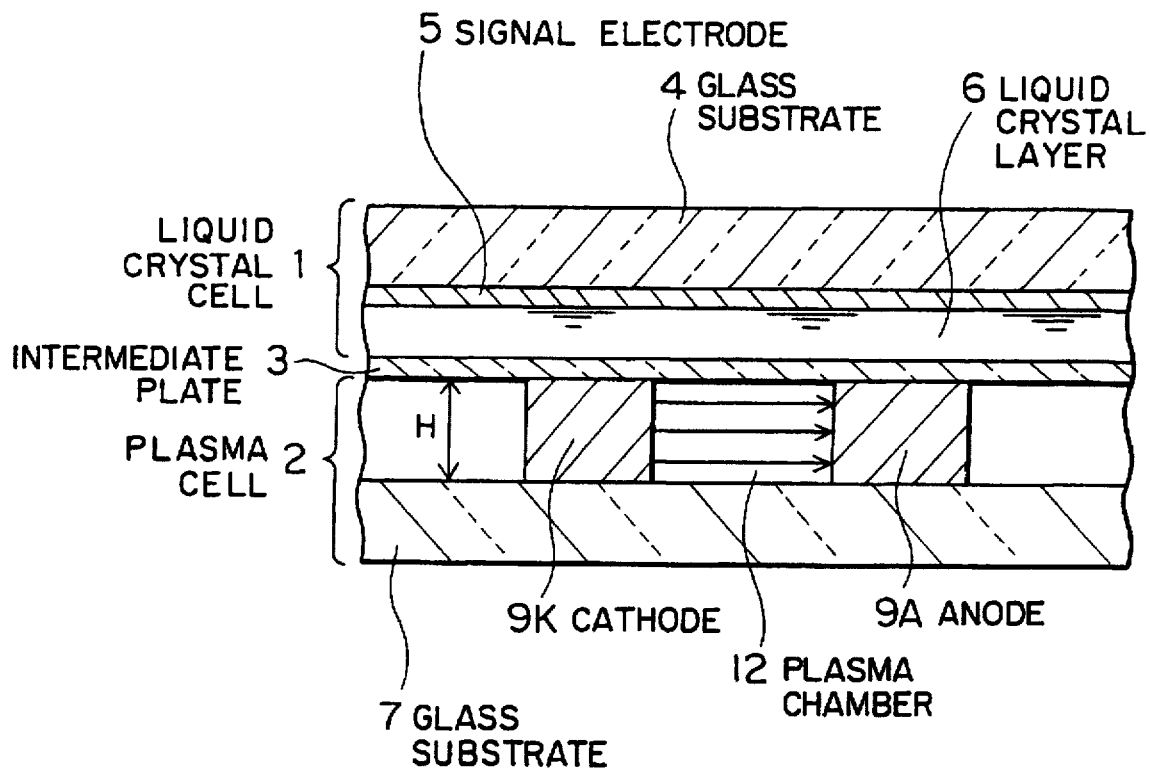
FIGS. 1 and 2 are schematic cross-sectional views of examples of the configuration of a plasma addressed display apparatus according to an embodiment of the present invention.
Figure 2:
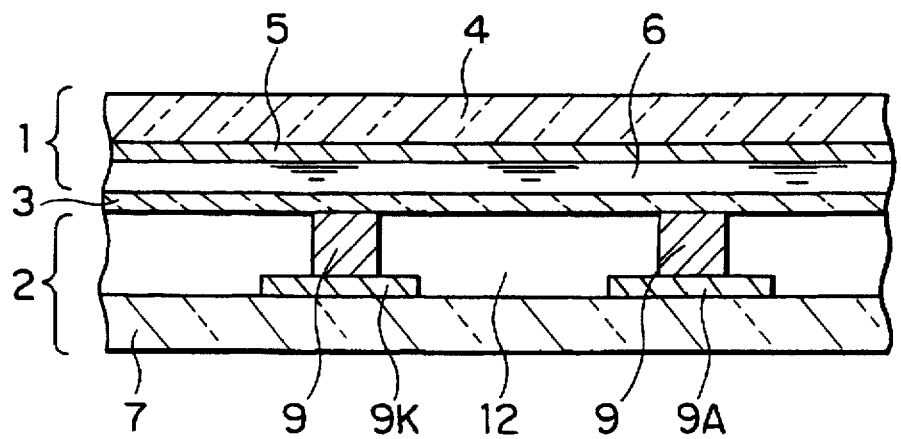
Figure 3:
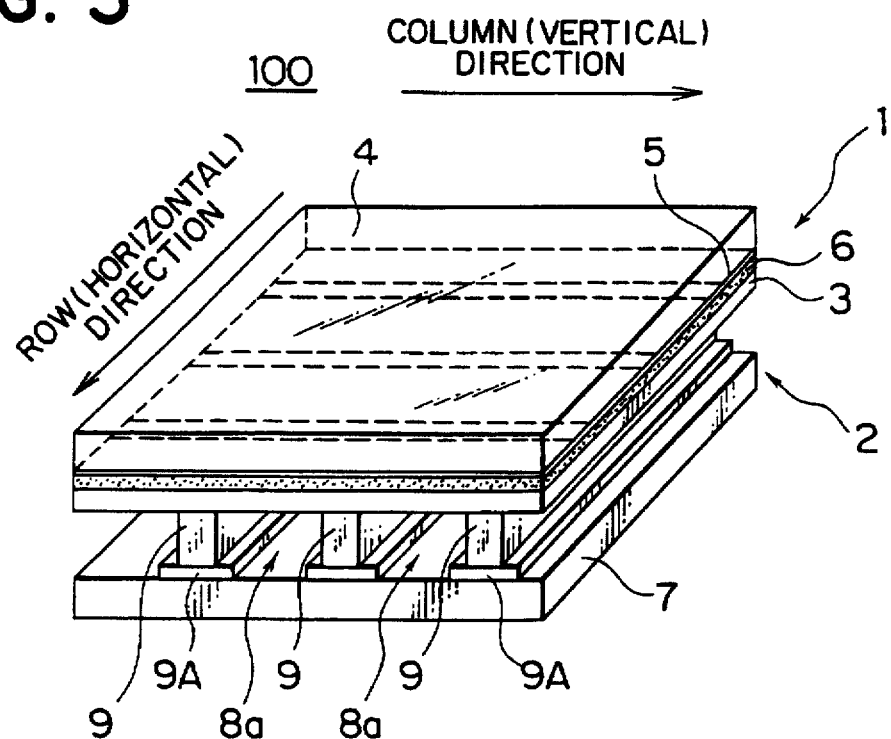
FIG. 3 is a perspective view of the plasma addressed display apparatus shown in FIG. 2.

FIGS. 1 and 2 are schematic partial cross-sectional views showing a construction of examples of a plasma address display apparatus which drives the liquid crystal cell by utilizing such a plasma switch and represents a shape cut along the column direction, that is, the signal electrode direction. In the example shown in FIG. 1, an explanation will be made by using as an example the plasma cell of a wall surface type electrode construction. In the example shown in FIG. 2, an explanation will be made by using a plasma cell of the flat plane type electrode construction. FIG. 3 is a perspective view of the plasma addressed display apparatus shown in FIG. 2.

The plasma addressed display apparatus according to the present invention is a plasma addressed display apparatus 100 comprised of an electro-optical display cell 1, a plasma cell 2, and a dielectric sheet 3 interposed between the two, thereby forming a flat panel construction. The dielectric sheet 3 is comprised of a thin plate of glass etc. The dielectric sheet 3 has to be made as thin as possible to enable driving of the display cell 1 and for example is formed to a thickness of about 50 μm.

The display cell 1 is comprised using an upper transparent glass substrate (top substrate) 4. On the main surface of the inside of the upper substrate 4 are formed a plurality of data electrodes 5, comprised of a transparent electroconductive material and extending in the column direction (vertical direction), in parallel in the row direction (horizontal direction) maintaining predetermined intervals along the column direction. The upper substrate 4 is joined to the dielectric sheet 3 in a state maintaining a certain clearance therewith by a spacer (not shown). In the clearance between the upper substrate 4 and the dielectric sheet 3 is filled a liquid crystal, serving as the electro-optical material, to form the liquid crystal layer 6. Here, the size of the clearance between the upper substrate 4 and the dielectric sheet 3 is made, for example, 4 to 10 μm. This distance is maintained uniformly over the entire display face. Note that in this embodiment, use was made of a liquid electro-optical material, but in the plasma addressed display apparatus of the present invention, this electro-optical material does not necessarily have to be a liquid crystal. Use may be made of an electro-optical crystal plate etc.

On the other hand, the plasma cell 2 is constituted using a lower glass substrate (lower substrate) 7. On the main surface of the inside of the lower substrate 7, a plurality of anode electrodes 9A and cathode electrodes 9K constituting the plasma electrodes and extending in the row direction are formed in parallel in the column direction while maintaining a predetermined interval between them. At the approximate centers of the top surfaces of the anode electrodes 9A and the cathode electrodes 9K are formed partition walls 9 of predetermined widths extending along those electrodes. The tops of the partition walls 9 abut against the bottom surfaces of the dielectric sheet 3 to maintain the size of the clearance between the lower substrate 8 and the dielectric sheet 3 constant. The partition walls 10 may, for example, be formed by repeated thick film screen printing.

Further, a frit sealing member (not shown) made using a low melting point glass etc. is laid along the periphery of the lower substrate 7 to enable air-tight bonding of the lower substrate 7 and the dielectric sheet 3. In the clearance between the lower substrate 7 and the dielectric sheet 3 are formed, in parallel in the column direction, a plurality of plasma chambers (spaces) 12 separated by the partition walls 10 and extending in the row direction. That is, the plasma chambers 12 are formed to be orthogonal with the data electrodes 5. The discharge gas filled in the plasma chambers 12 will be explained later.

Figure 4:
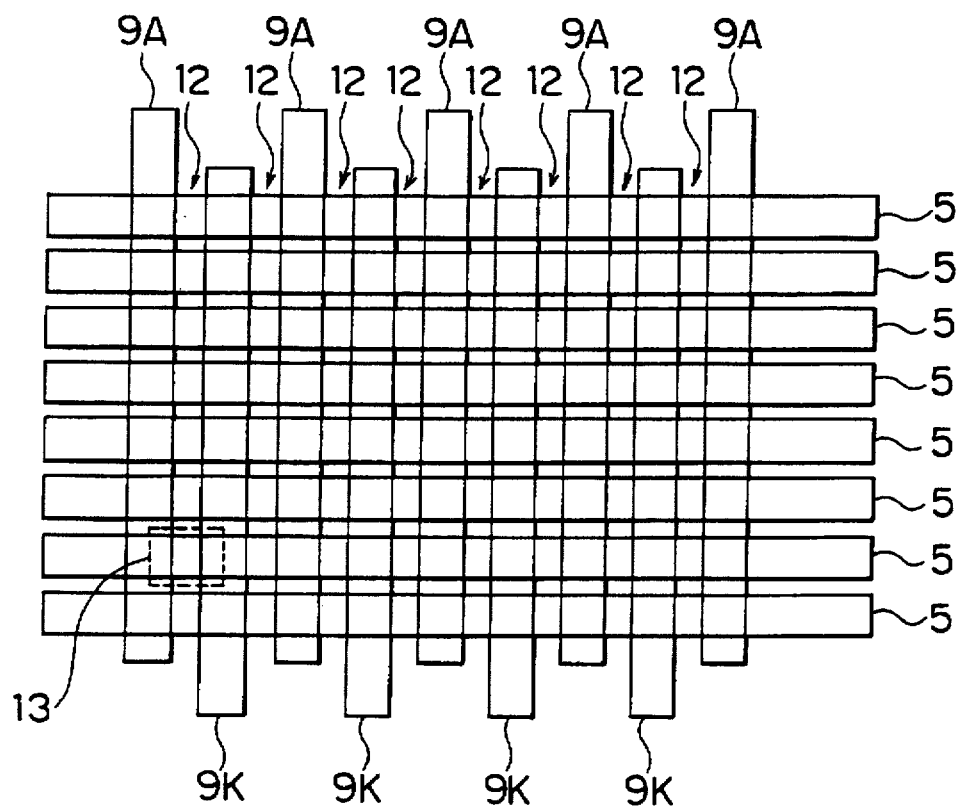
FIG. 4 is a view showing the arrangement of the data electrodes, plasma electrodes, and plasma chambers in the plasma addressed display apparatus shown in FIG. 3.

The data electrodes 5 become the row driven elements. Further, as mentioned later, since the anode electrodes 9A are connected in common and supplied with an anode voltage, the pair of plasma chambers 12 positioned at the two sides of each cathode electrode 9K become column-driven units. A pixel 13 is defined, as shown in FIG. 4, at the intersection of the two.

In the above configuration, when a predetermined voltage is supplied between the anode electrode 9A and the cathode electrode 9K corresponding to a predetermined pair of plasma chambers 12, the gas at the portion of the pair of plasma chambers 12 is selectively ionized and generates a plasma discharge. A substantially anodic potential is maintained inside. In this state, when data voltage is successively supplied to a data electrode 5, data voltage is written through the dielectric sheet 3 at the liquid crystal layers 7 of the plurality of pixels 13 arranged in the row direction corresponding to the pair of plasma chambers 12 where the plasma discharge occurred. When the plasma discharge ends, the plasma chambers 12 become floating potentials and the data voltage written in the liquid crystal layers 7 of the pixels 13 are held by the action of the dielectric sheet 3 until the next writing period (for example, after one frame). In this case, the plasma chambers 12 function as sampling switches and the liquid crystal layers 7 of the pixels and/or the dielectric sheet 3 function as sampling capacitors.

Since the liquid crystal operates due to the data voltage written in the liquid crystal layers 7 of the pixels 13, the display is performed in pixel units. Accordingly, as mentioned above, it is possible to display a two-dimensional image by generating a plasma discharge and successively scanning in the column direction the pairs of plasma chambers 12 where data voltage has been written in the liquid crystal layers 7 of the plurality of pixels 13 arranged in the row direction.

Figure 5:
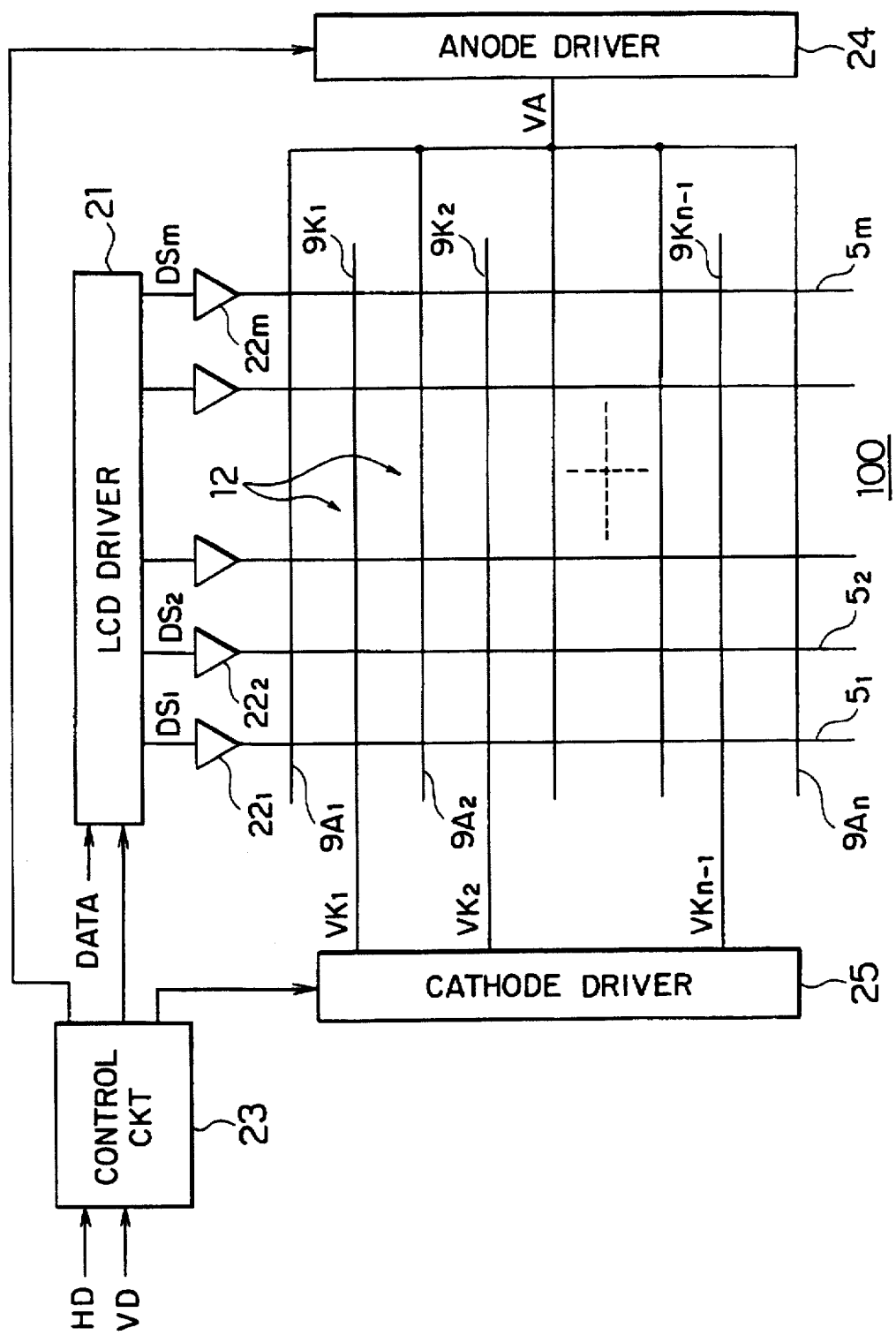
FIG. 5 is a view of the circuit configuration of a plasma addressed display apparatus.

FIG. 5 is a view of the circuit configuration of the plasma addressed display apparatus 100 explained above. In FIG. 5, portions corresponding to FIG. 1 to FIG. 3 are given the same references. Reference numeral 21 is a liquid crystal driver, which liquid crystal driver 21 is supplied with video data (DATA). Data voltage s $DS_1$ to $DS_m$ of a plurality of pixels constituting the lines are simultaneously output from the liquid crystal driver 21. The data voltage s $DS_1$ to $DS_m$ of the plurality of pixels are supplied through the buffers $22_1$ to $22_m$ to the plurality of data electrodes $5_1$ to $5_m$.

Note that the operation of the liquid crystal driver 21 is controlled by the control circuit 23. The control circuit 23 is supplied with a horizontal synchronization signal HD and a vertical synchronization signal VD as reference synchronization signals corresponding to the video data (DATA). Further, the operations of the later mentioned anode driver 24 and cathode driver 24 are controlled by the control circuit 23.

Reference numeral 24 denotes an anode driver. This anode driver 24 supplies a plurality of commonly connected anode electrodes $9A_1$ to $9A_n$ with an anode voltage VA as a reference voltage. Reference numeral 25 is a cathode driver. The cathode driver 25 supplies the cathode voltage s $VK_1$ to $VK_{n-1}$ having a predetermined potential difference from the anode potential to the plurality of cathode electrodes $9K_1$ to $9K_{n-1}$ every horizontal period. Due to this, a plasma discharge is caused at the pairs of plasma chambers 12 corresponding to the cathode electrodes $9K_1$ to $9K_{n-1}$ every horizontal period and, accordingly, the pairs of plasma chambers 12 where data voltage s $DS_1$ to $DS_m$ are written in the liquid crystal layers 7 of the plurality of pixels 13 arranged in the row direction (horizontal direction) are successively scanned in the column direction (vertical direction).

Here, an explanation will be made of the cathode voltage supplied to the cathode electrode 9K and the data voltage DS supplied to the data electrode 5. FIGS. 4A to 4D are views of wave-forms of the cathode voltage s $VK_a$ to $VK_{a+3}$ supplied to the consecutive cathode electrodes $9K_a$ to $9K_{a+3}$. FIG. 4E is a view of the data voltage DS supplied to a predetermined data electrode 5. The cathode electrodes $9K_{a+3}$ to $9K_{a+3}$ are supplied with the cathode voltage s $VK_a$ to $VK_{a+3}$ having a predetermined potential difference from the anode potential within consecutive single horizontal periods (1H) every frame. Due to this, the plasma chambers 12 generating the plasma discharge are successively scanned in the column direction (vertical direction). Further, the data voltage DS is inverted in polarity with respect to the anode potential every horizontal period and every frame, so the liquid crystal layers 7 are alternately driven. The liquid crystal layers 7 are alternately driven so as to prevent deterioration of the liquid crystals.

First Embodiment

In the present embodiment, in the internal portion of this tight sealed plasma chamber 12, a mixed gas represented by $Ne_{100-x}A_x$ (wherein, in the formula, A is any element selected from a group consisting of Ar, Kr, and Xe and x is 10 to 30% by volume, more preferably 15 to 25% by volume) is sealed. Note that, in this mixed gas, if the content of the A component is less than 10 percent by volume, a problem of emission of the orange color light peculiar to Ne occurs, while if it exceeds 30 percent by volume, the discharge voltage Vf extremely rises, neither or which is preferred. Also, among the Ar, Kr, and Xe to be mixed into the Ne, mainly from an economical viewpoint, Ar and Kr are preferred.

Note that, as shown in FIG. 1, where the wall surface electrode construction (parallel flat plate electrode construction) is adopted in this way, a gas pressure two times higher than that of the flat plane electrode construction as disclosed in Japanese Unexamined Patent Publication (Kokai) No. 3-47784 is necessary, and also the discharge starting voltage becomes higher by about several tens of volts. The reason for this can be considered to be that the discharge route of the wall surface electrode construction is a straight line and is shortened while the discharge route of the flat plane electrode construction is a parabola. Accordingly, a relatively high gas pressure becomes necessary based on the rule of Paschen. The discharge starting voltage is affected by various factors such as the surface state of the wall surface electrode etc. and it becomes slightly high. However, the wall surface electrode construction as in this embodiment is advantageous in the point that a stable plasma discharge in comparison with the flat plane electrode construction is obtained and the point that the plasma discharge can be efficiently carried out etc. and is advantageous in view of the fewer restrictions at the time of a production of the cell construction in comparison with the inclined plane electrode construction as disclosed in Japanese Unexamined Patent Publication (Kokai) No. 1-217396. However, of course, in the plasma addressed display apparatus of the present invention, there is no restriction on the construction of the plasma cell either, and various types of aspects as described above can be adopted. For example, in the example shown in FIG. 1, an explanation was made by using as an example the plasma cell of a wall surface type electrode construction, but in the present invention, the electrode construction is not particularly restricted and the invention can be applied also with respect to a plasma cell of the flat plane type electrode construction shown in FIG. 2. In the electrode construction shown in FIG. 2, the electrodes of the cathode 9K and anode 9A are formed in a flat state, a partition wall 9 is formed on them, and a plasma chamber 8a is formed between the partition wall 9 and another partition wall 9.

Next, the effect of the present invention was examined by an experiment as will be mentioned below by actually preparing a plasma addressed display apparatus having the configuration as shown in FIG. 1.

Figure 7:
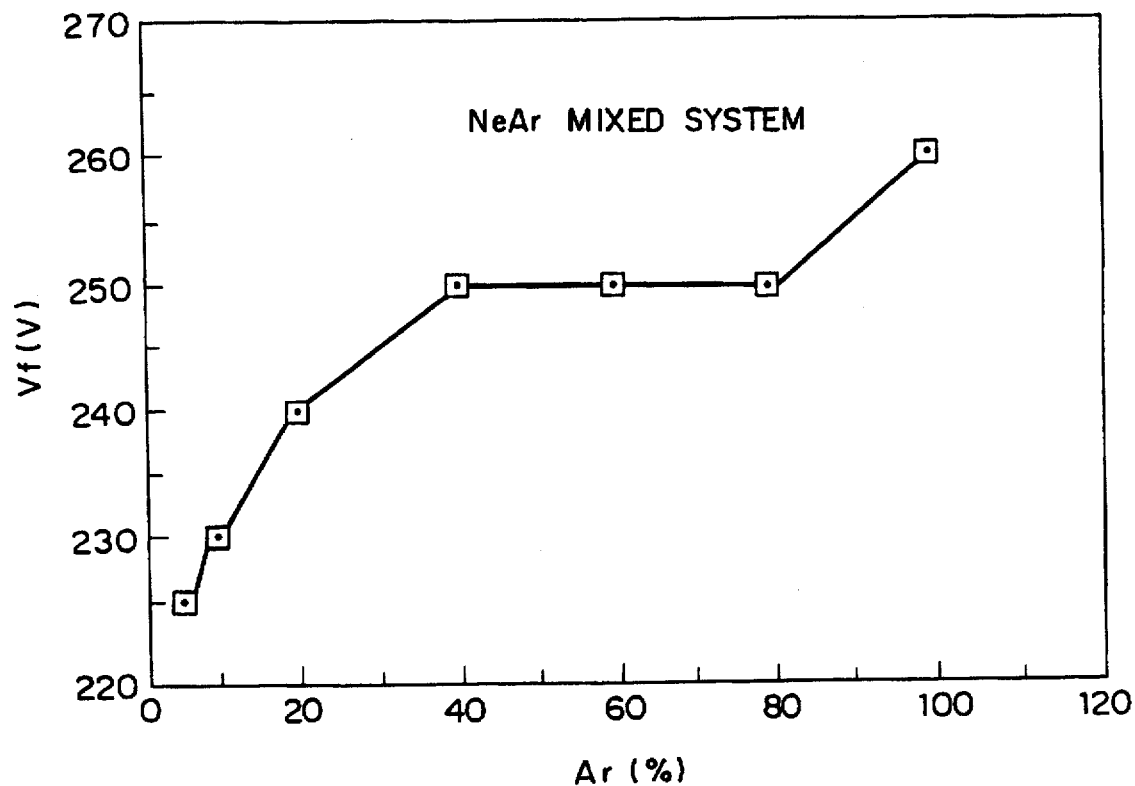
FIG. 7 is a graph of the relationship between the composition of an Ne—Ar-based mixed gas and a discharge voltage.

First, mixed gases obtained by adding the Ar to Ne with various proportions were prepared and were sealed in plasma chambers. The discharge voltages which were necessary were then measured. The results thereof are as shown in FIG. 7. In comparison with the Ne-based Penning gas ($Ne_{99.5}Ar_{0.5}$), it is clear that, although the discharge voltage rises also in the area of composition according to the present invention, the amount of the rise can be suppressed to about 20 V.

Figure 8:
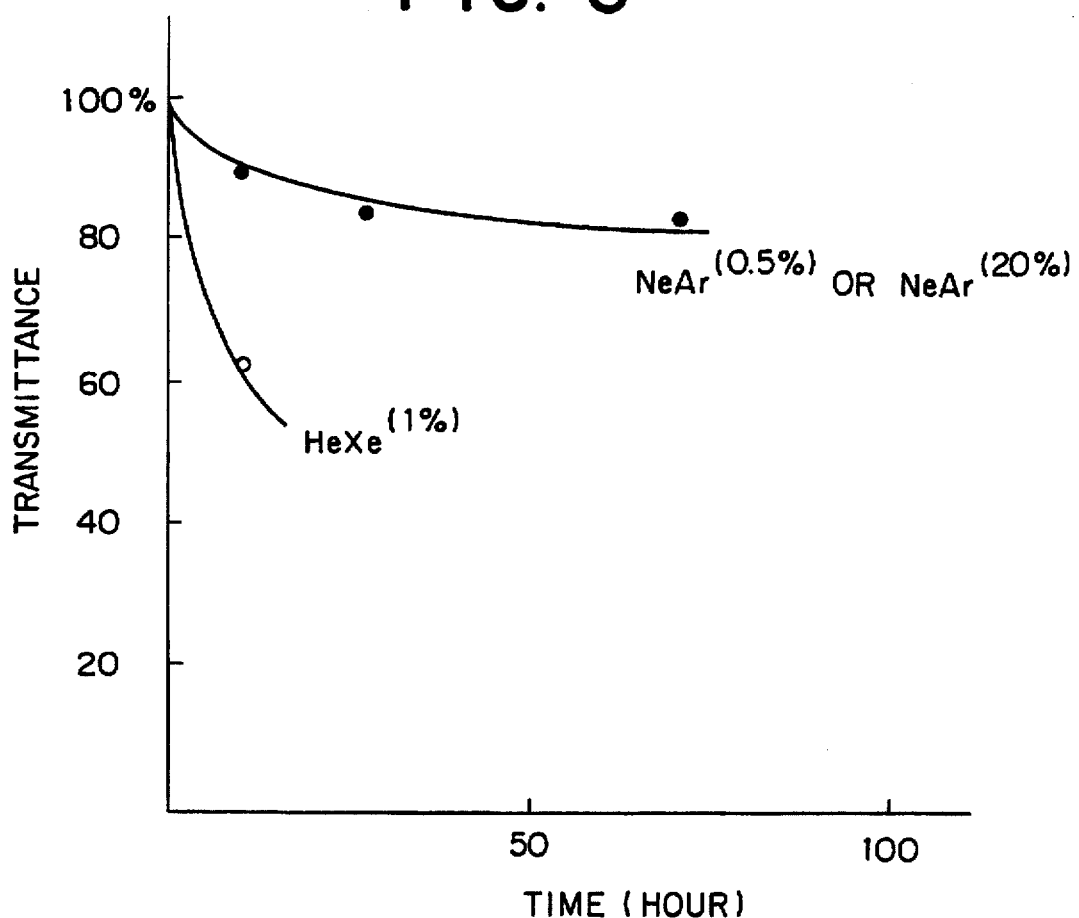
FIG. 8 is a graph of the relationship between various types of mixed gases and the change of the transmittance.

Next, an He-based Penning gas ($He_{99}Xe_1$), Ne-based Penning gas ($Ne_{99.5}Ar_{0.5}$), and a mixed gas ($He_{100-x}A_x$, x=10 to 30) having a composition according to the present invention were prepared and were sealed in plasma chambers. The change of transmittance by the cathode sputtering was examined. Note that, the measurement conditions were determined so that the gas pressure was 200 Torr and a current per line was 100 mA. A discharge was carried out at a cycle of one discharge of 10 μsec for every 16 msec. The addition of mercury was not carried out. The obtained results are as shown in FIG. 8. In comparison with the He-based Penning gas, the Ne-based Penning gas and the mixed gas having a composition according to the present invention had a very low rate of reduction of the transmittance.

Further, the He-based Penning gas ($He_{99}Xe_1$), Ne-based Penning gas ($Ne_{99.5}Ar_{0.5}$), and the mixed gas ($Ne_{80}Ar_2$) having a composition according to the present invention were prepared and were sealed in plasma chambers. A comparison of the discharge color was carried out. Note that, the comparison of the discharge color was carried out by setting the current per line as 100 mA. As a result, the proportion of the emitted light luminance among the $He_{99}Xe_1$, $Ne_{99.5}Ar_{0.5}$, and $Ne_{80}Ar_{20}$ was 1: 18: 3, and the color coordinates (x, y) became (0.33, 0.27), (0.63, 0.37), and (0.58, 0.39), respectively. Although not comparable to the He-based Penning gas, $Ne_{80}Ar_{20}$ has a sufficiently low luminance in comparison with the Ne-based Penning gas, and also the color of this is near white.

When speaking of this by using an actual panel, where a discharge current per line in a 14 inch panel is 100 mA, the luminance of the discharge light of the Ne-based Penning gas reaches 0.3 nit. In the case of the He-based Penning gas, this is an amount that cannot be ignored with respect to a black level of 2 nit (determined by the light polarization plate liquid crystal), but in the case of $Ne_{80}Ar_{20}$, it becomes 0.1 nit or less, and a sufficient black level is obtained. The result can be expected to become a display panel having a good contrast.

As mentioned above, according to the first embodiment of the present invention, a plasma addressed display apparatus which can exhibit good characteristics stably over a long period can be provided.

In the above description, the plasma addressed display apparatus was described as a specific example, but, it is clearly understood the present invention can be applied to a plasma discharge apparatus, per se, and other display apparatus using such plasma discharge apparatus as a switching apparatus.

Second Embodiment

In the first embodiment, however, there is the problem of a long plasma attenuation. If the plasma attenuation is long, there is the problem that plasma will remain until the next line is selected and erroneous data voltage will be applied to a row where the plasma remains and therefore the pixel of the display cell corresponding to that portion will be driven erroneously.

A second embodiment is intended to improve the first embodiment.

In the second embodiment, the plasma chambers 12 have sealed in them a mixed gas represent ed by $Ne_{100-(x+y)}Ar_xA_y$. Here, A is Ar, Kr, and/or Xe, x is 10 to 30 percent by volume, more preferably 15 to 25 percent by volume, and y is 1 to 10 percent by volume. Further, when Kr and Xe are included as A, the Kr is preferably contained in an amount of 1 to 5 percent by volume and the Xe in an amount of 1 to 5 percent by volume.

When the x is less than 10 percent by volume, the problem of emission of an orangish light peculiar to Ne occurs, while when it is over 30 percent by volume, the discharge voltage Vf ends up rising remarkably. Neither of these cases is preferable. When y is smaller than 1 percent by volume, the plasma attenuation time becomes longer, while when it is over 10 percent by volume, the other properties become poor. Neither of these is preferred either.

Next, the effect of the present invention was examined by an experiment as mentioned below in which a plasma addressed display apparatus having the structures as shown in FIGS. 2 and 3 were actually fabricated.

First, mixed gases obtained by adding Ar to Ne in various proportions were prepared, were sealed in plasma chambers, and were measured as to the discharge voltages which were necessary. The results thereof are as shown in FIG. 7. In comparison with the Ne-based Penning gas ($Ne_{99.5}Ar_{0.5}$), it became clear that although the discharge voltage rises also in the range of the composition according to the present invention, the amount of the rise can be suppressed to about 20 V.

Next, an He-based Penning gas ($He_{99}Xe_1$) and a mixed gas of the composition according to the present invention ($Ne_{76}Ar_{20}Kr_2Xe_2$) were prepared, were sealed in plasma chambers, and were examined as to the change of transmittance by cathode sputtering. Note that the measurement conditions were made a gas pressure of 200 Torr and a current per line of 100 mA and discharge was carried out at a cycle of a discharge of 10 μsec every 16 msec. Mercury was not added. The obtained results are as shown in FIG. 8. In comparison with the He-based Penning gas, the mixed gas of the composition according to the present invention had a very low rate of reduction of the transmittance.

Further, the He-based Penning gas ($He_{99}Xe_1$), Ne-based Penning gas ($Ne_{99.5}Ar_{0.5}$), and the mixed gas of the composition according to the present invention ($Ne_{76}Ar_{20}Kr_2Xe_2$) were prepared, were sealed in plasma chambers, and were compared as to the discharge color. Note that the comparison of the discharge color was carried out by setting the current per line as 100 mA. As a result, the ratio of the luminance of the emitted light among the $He_{99}Xe_1$, $Ne_{99.5}Ar_{0.5}$, and $Ne_{76}Ar_{20}Kr_2Xe_2$ was 1:18:3 and the color coordinates (x, y) became (0.33, 0.27), (0.63, 0.37), and (0.58, 0.39), respectively. Although not comparable to the He-based Penning gas, $Ne_{76}Ar_{20}Kr_2Xe_2$ has a sufficiently low luminance in comparison with the Ne-based Penning gas and also its color is near white.

When speaking of this using an actual panel, where a discharge current per line in a 14-inch panel is 100 mA, the luminance of the emitted light of the Ne-based Penning gas reaches 0.3 nit. In the case of the He-based Penning gas, it is an amount that cannot be ignored with respect to a black level of 2 nit (determined by the light polarization plate liquid crystal), but in the case of $Ne_{76}Ar_{20}Kr_2Xe_2$, it becomes 0.1 nit or less and so a sufficient black level is obtained and it can be expected that the result will become a display panel having a good contrast.

When $Ne_{76}Ar_{20}Kr_2Xe_2$ was used as the discharge gas of the plasma addressed display apparatus, the plasma attenuation time was found to be 20 μsec. When $Ne_{70}Ar_{20}Kr_5Xe_5$ was used as the discharge gas of the plasma addressed display apparatus, the plasma attenuation time was found to be 20 μsec. When $Ne_{78}Ar_{20}Kr_2$ was used as the discharge gas of the plasma addressed display apparatus, the plasma attenuation time was found to be 30 μsec. When $Ne_{78}Ar_{20}Xe_2$ was used as the discharge gas of the plasma addressed display apparatus, the plasma attenuation time was found to be 30 μsec. As a comparison, $Ne_{80}Ar_{20}$ was used as the discharge gas of the plasma addressed display apparatus, whereupon the plasma attenuation time was found to be 40 μsec.

Figure 9:
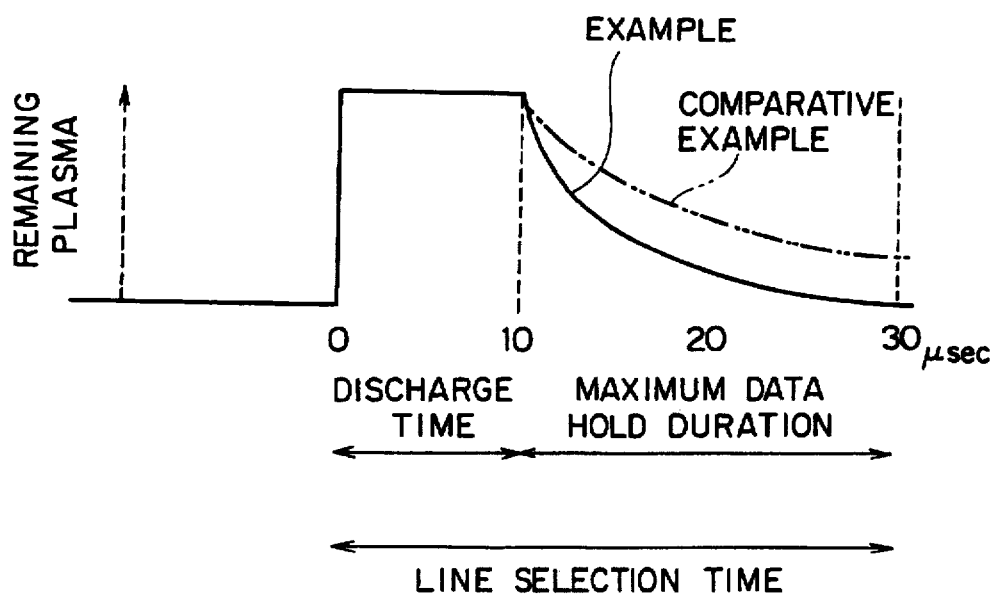
FIG. 9 is a view of the relationship between the residual amount of plasma in the case of use of the discharge gas according to the embodiment of the present invention and the case of use of the discharge gas according to a comparative example.

As shown in FIG. 9, in a picture of the double speed NTSC system, the assigned time per line (selection time) is 30 μsec. Further, in the Japanese "high vision" system (high definition system), it is a shorter 15 μsec. The discharge time accounts for 10 μsec of this. According, in a double speed NTSC system, the maximum data holding time becomes 20 μsec and so, in the case of a comparative example using $Ne_{80}Ar_{20}$ as the discharge gas, plasma will remain until the next line selection and there will be a chance of erroneous writing of data and a sufficient contrast will not be obtained. As opposed to this, in the embodiment of the present invention using $Ne_{76}Ar_{20}Kr_2Xe_2$ or $Ne_{70}Ar_{20}Kr_5Xe_5$ as the discharge gas, as shown in FIG. 7, no plasma will remain at the time of the next line selection, so it is possible to prevent erroneous writing of data and a sufficient contrast can be obtained in the apparatus even in a double speed NTSC display.

Note that the present invention is not limited to the above embodiments. Various modifications may be made within the scope of the invention.

For example, the plasma addressed display apparatus according to the above embodiments was a plasma addressed display apparatus, but the invention is not limited to this. For example, the configuration of the cathode electrodes and anode electrodes of the plasma addressed display apparatus is not limited to that of the above embodiment, but can be modified in various ways. For instance, when performing AC discharge, either of the electrodes can be buried in the dielectric layer and not be directly exposed in the plasma chambers. Further, the plasma addressed display apparatus according to the present invention is not limited to a plasma addressed display apparatus and can be applied to optical modulators and other plasma addressed display apparatus s in the broader sense.

As explained above, according to the plasma addressed display apparatus of the present invention, it is possible to form plasma stabler compared with the conventionally used He-based a Penning gas with little problem of the scattering and loss of gas molecules from the plasma cell.

Also, in comparison with the He-based Penning gas, with the Ne-based the mixed gas according to the present invention, the rate of advance of the cathode sputtering is much slower in the same way as the conventional Ne-based Penning gas and the rate of deterioration of the transmittance due to such cathode sputtering is slower by one order than a case where the He-based Penning gas is used.

Further, where the mixed gas according to the present invention is used, although not comparable to the case where the He-based Penning gas is used, the luminance is sufficiently low in comparison with the case of the Ne-based Penning gas, the color is close to white, and the contrast of the display and the color purity are not substantially impaired, so good characteristics are obtained.

Note that, by adding Ar or the like to the Ne, the discharge voltage Vf which is needed rises in comparison with the case of the Ne-based Penning gas, but in the present invention, the amount of addition thereof is restricted to 10 to 30 percent by volume, and therefore the amount of rise thereof is suppressed to about 20 v and it is possible to substantially prevent problems such as a rise of the power consumption, voltage resistance of the driver transistor, etc.

Further, in the present invention, since a specific ratio of Kr and/or Xe is mixed in the Ne—Ar (10 to 30 percent by volume)-based gas, the attenuation time of the plasma can be reduced to about one-half that of the Ne—Ar (10 to 30 percent by volume)-based gas. If the attenuation time of the plasma is made shorter, there is no longer erroneous application of data voltage to pixels corresponding to plasma chambers which should inherently not be written in at the time of the next line selection and a sufficient contrast can be obtained.

In the above description, the plasma addressed display apparatus was described as a specific example, but, it is clearly understood the present invention can be applied to a plasma discharge apparatus, per se, and other display apparatus using such plasma discharge apparatus as a switching apparatus.

What is claimed is:

1. A plasma discharge apparatus, comprising:
   a pair of substrates for forming a discharge space; and
   an ionizable gas sealed in the discharge space, said ionizable gas being a mixed gas comprising neon plus 10 to 30 percent by volume of an element selected from the group consisting of argon, krypton, and xenon, said mixed gas comprises neon plus 10 to 30 percent by volume of argon, 1 to 5 percent by volume of krypton, and 1 to 5 percent by volume of xenon.

2. A plasma discharge apparatus as set forth in claim 1, wherein one of said pair of substrates comprises a dielectric sheet.

3. A plasma discharge apparatus as set forth in claim 2, further comprising an electro-optical cell holding an electro-optical material between said dielectric sheet and a glass substrate.

4. A plasma discharge apparatus as set forth in claim 3, wherein said electro-optical cell comprises a liquid crystal display cell which has a plurality of signal electrodes arranged in parallel at the inside of said glass substrate and which has as said electro-optical material a liquid crystal.

5. A plasma discharge apparatus as set forth in claim 4, wherein the other of the pair of substrates has a plurality of discharge electrodes on it and a plasma discharge is caused between adjoining discharge electrodes to address the liquid crystal cell.

6. A plasma addressed electro-optical apparatus comprising:
   a plasma cell where plasma discharge is performed;
   an ionizable gas sealed in the plasma cell, the ionizable gas being a mixed gas comprising neon plus 10 to 30 percent by volume of an element selected from the group consisting of argon, krypton, and xenon, said mixed gas comprises neon plus 10 to 30 percent by volume of argon, 1 to 5 percent by volume of krypton, and 1 to 5 percent by volume of xenon; and
   an electro-optical cell layered on said plasma cell and addressed by the plasma discharge.

7. A plasma addressed electro-optical apparatus as set forth in claim 6, further comprising a dielectric sheet interposed between said plasma cell and electro-optical cell.

8. A plasma addressed electro-optical apparatus as set forth in claim 7, wherein said electro-optical cell is a liquid crystal display cell comprising a liquid crystal filled between a first glass substrate having a plurality of signal electrodes arranged in parallel on the inside and said dielectric sheet.

9. A plasma addressed electro-optical apparatus as set forth in claim 6, wherein said plasma cell comprises a second glass substrate and said dielectric sheet between which is sealed said ionizable gas.

10. A plasma addressed electro-optical apparatus as set forth in claim 9, wherein said plasma cell is provided with a plurality of discharge electrodes formed on said second glass substrate and a plasma discharge is caused between adjoining discharge electrodes to address the electro-optical cell.

11. A plasma discharge apparatus as set forth in claim 1, wherein said mixed gas comprises 76 percent by volume neon, plus 20 percent by volume of argon, 2 percent by volume of krypton, and 2 percent by volume of xenon.

12. A plasma discharge apparatus as set forth in claim 1, wherein said mixed gas comprises 70 percent by volume neon, plus 20 percent by volume of argon, 5 percent by volume of krypton, and 5 percent by volume of xenon.

* * * * *